US007478794B1

(12) United States Patent
Gohlke et al.

(10) Patent No.: US 7,478,794 B1
(45) Date of Patent: Jan. 20, 2009

(54) APPARATUS AND METHODS FOR GRIPPING AN ELONGATED ITEM

(75) Inventors: Henry Gohlke, Houston, TX (US); Jianmin Li, Houston, TX (US)

(73) Assignee: Rectorseal Corporation, Houston, TX (US)

( * ) Notice: Subject to any disclaimer, the term of this patent is extended or adjusted under 35 U.S.C. 154(b) by 84 days.

(21) Appl. No.: 11/527,130

(22) Filed: Sep. 26, 2006

(51) Int. Cl.
*B66F 3/00* (2006.01)
(52) U.S. Cl. ................ 254/134.3 FT; 254/134.3 R
(58) Field of Classification Search ........ 254/134.3 FT, 254/134.3 R, 134.6
See application file for complete search history.

(56) References Cited

U.S. PATENT DOCUMENTS

| 524,035 | A | 8/1894 | White |
| 2,231,919 | A | 2/1941 | Kent |
| 3,727,967 | A | 4/1973 | Anastasiu et al. |
| 3,906,619 | A | 9/1975 | Shaffer |
| 4,368,910 | A | 1/1983 | Fidrych |
| 4,453,291 | A | 6/1984 | Fidrych |
| 4,736,978 | A | 4/1988 | Cielker |
| 5,245,730 | A | 9/1993 | Martin |
| 5,283,930 | A * | 2/1994 | Krauss ............... 24/129 R |
| 5,513,555 | A * | 5/1996 | Plank et al. ............. 92/19 |
| 5,868,060 | A * | 2/1999 | Plank et al. ............. 92/19 |
| 6,471,268 | B1 | 10/2002 | Stenstrom et al. |
| 6,695,290 | B1 * | 2/2004 | O'Connell ........... 254/133 R |
| 6,883,782 | B2 * | 4/2005 | Ames et al. ....... 254/134.3 FT |
| 7,128,306 | B2 * | 10/2006 | Ames et al. ....... 254/134.3 FT |
| 7,246,789 | B2 * | 7/2007 | Ames et al. ............. 254/134 |
| 2004/0041136 | A1 * | 3/2004 | Ames et al. ....... 254/134.3 FT |

* cited by examiner

*Primary Examiner*—Lee D Wilson
(74) *Attorney, Agent, or Firm*—Jones & Smith, LLP; E. Randall Smith

(57) ABSTRACT

In some embodiments, apparatus for releasably gripping at least one elongated item and being used in pulling the elongated item(s) through at least one space includes a body and a plurality of gripping members associated with the body. The gripping members are moveable relative to the body and capable of engaging at least one elongated item.

76 Claims, 8 Drawing Sheets

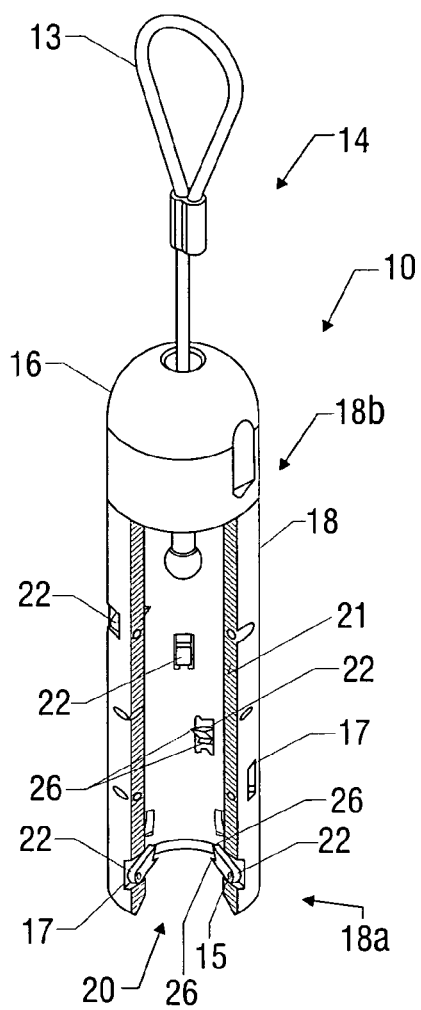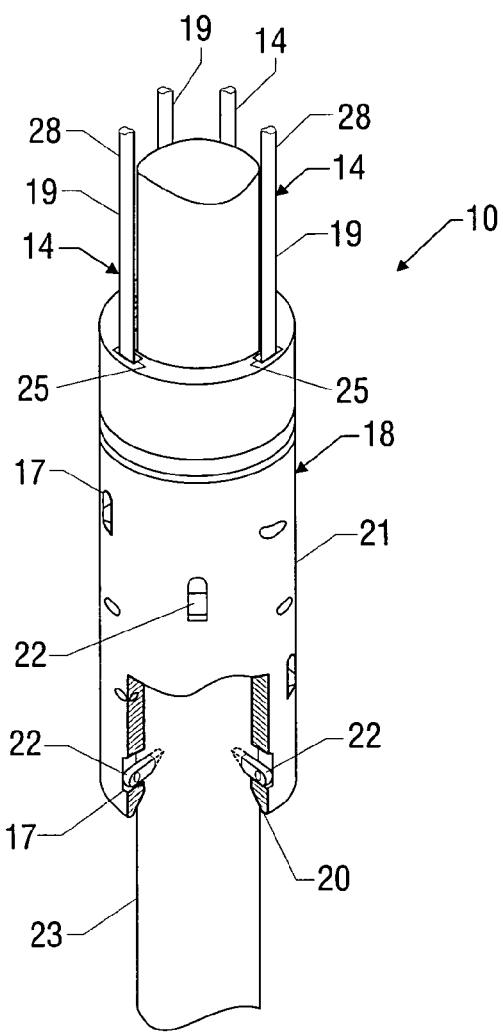
FIG. 1
FIG. 2

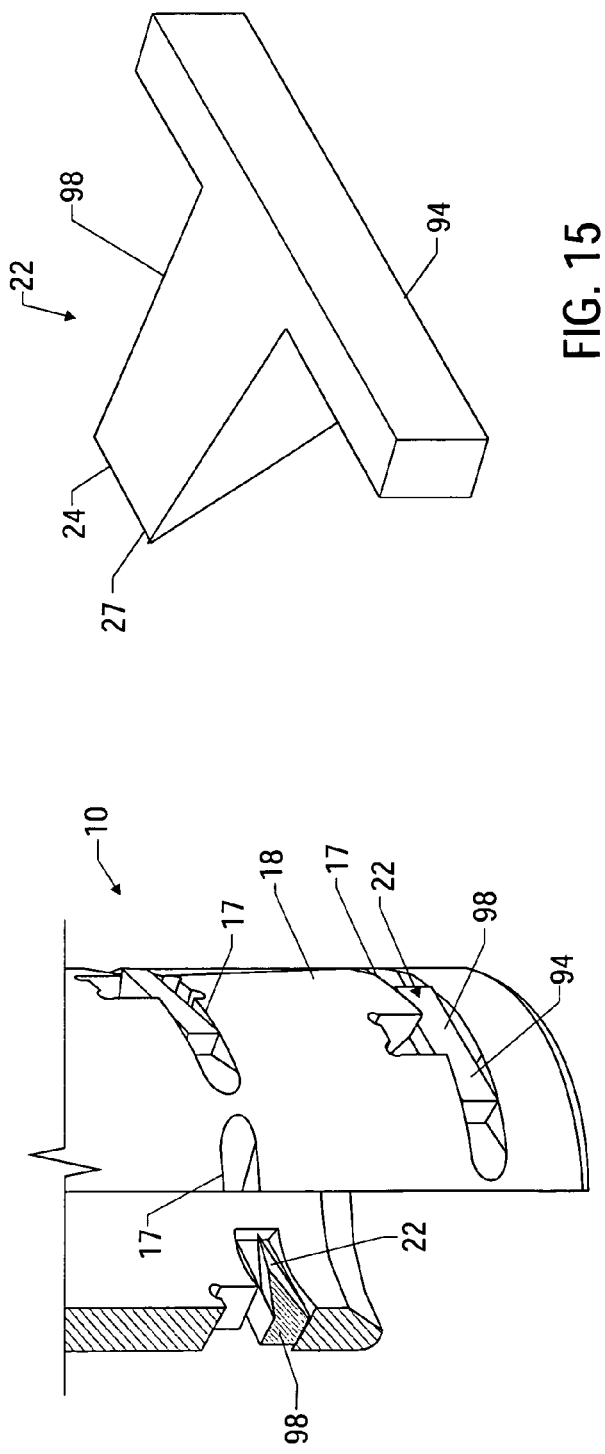
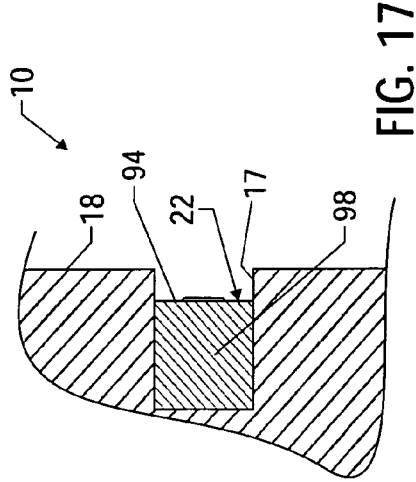

APPARATUS AND METHODS FOR GRIPPING AN ELONGATED ITEM

FIELD OF THE INVENTION

The present invention relates generally to gripping elongated items. In some embodiments, the present invention involves apparatus and methods for releasably gripping an elongated item to allow the item to be pulled through a space or path.

BACKGROUND OF THE INVENTION

There are many circumstances in which it is necessary or desirable to releasably grip one or more items having an elongated portion so that it may be moved from one location to another, or spread across a desired area. For example, in the electrical and telecommunication industries, wires or cables, such as fiber optic cables and copper power and telecommunication wires, are often pulled through one or more conduits. The conduit may have any desired length and location, such as underground, through buildings, overhead and even inside vehicles and machines. The wires or cables may be single strand or include multiple lines. A single telephone cable, for example, may include five hundred twisted copper wires surrounded by insulation and plastic sheathing.

Depending upon the application, one or more enhancements to existing technology may improve the ability to move the items. For examples, the item(s) being moved may be very heavy or the desired path may be very long, requiring a significant pulling force that the gripping device and method must support. For yet other examples, centering the elongated item in the gripping device, or gripping one or more inside surfaces of the elongated items may enhance or expand the ability to move items. For still a further example, it is sometimes preferable to pull multiple lines at the same time.

It should be understood that the above-described examples, features and/or disadvantages are provided for illustrative purposes only and are not intended to limit the scope or subject matter of the claims of this patent or any patent claiming priority hereto. Thus, none of the appended claims or claims of any related patent should be limited by the above discussion or construed to address, include or exclude the cited examples, features and/or disadvantages, except and only to the extent as may be expressly stated in a particular claim.

Accordingly, it would be desirable to have apparatus and methods for gripping at least one elongated item and having one or more of the following features, capabilities or attributes: includes gripping members having multiple grippers; includes gripping members capable of projecting outwardly to engage at least one inside portion of at least one elongated item; includes at least one biasing member associated with at least one gripping member; includes biasing members associated with gripping members to restrict movement of the associated gripping members in one direction; includes biasing members associated with gripping members to facilitate engagement of the associated gripping members with an elongated item; includes multiple gripping members disposed upon a common carrier; includes pairs of gripping members mounted upon common pins, respectively; assists in centering the elongated item in the apparatus; assists in centering at least one elongated item in the bore of the apparatus to enhance gripping of the elongated item(s) by gripping members; prevents undesirable or damaging penetration of an elongated item by gripping members; includes at least one centering device that assists in preventing non-engagement of the gripping members with at least one elongated item; includes at least one centering device capable of preventing gripping members from penetrating the elongated item more than desired; includes gripping members that assist in centering the elongated item; prevents gripping members from being too far tangential relative to an elongated item associated with the apparatus; prevents gripping member from skidding along the outside of an elongated item associated with the apparatus; is capable of gripping different diameter elongated items; is capable of gripping a greater range of outer diameter cables; is capable of gripping elongated items with different insulation thicknesses; is capable of gripping a non-end portion of an elongated item; includes at least one attachment device for facilitating pulling the apparatus and which does not obstruct the passage of an elongated item entirely through the apparatus; is capable of connecting multiple axially aligned gripping devices that grip a common elongated item; provides a flexible connector between multiple axially aligned gripping devices that grip a common elongated item; allows multiple gripping devices to be axially connected to increase pulling capacity; allows multiple gripping devices to be axially connected to enhance the gripping of the elongated item; allows multiple gripping devices to be axially connected to provide movement flexibility of the elongated items; allows multiple gripping devices to be axially connected to accommodate non-linear pulling paths, such as turns or curves; allows pulling heavy elongated items; allows pulling elongated items over a long path; allow pulling elongated items under significant drag forces; allows gripping members to cut through one or more insulation layers of an elongated items and deform, without undesirably damaging, the core of the elongated item; includes non-rotating gripping members; includes fixed position gripping members; includes a body formed of multiple pieces that may be disassembled; includes a clam shell-like, or split body, arrangement allowing ease of disengagement with an elongated item; or a combination thereof.

BRIEF SUMMARY OF THE INVENTION

In some embodiments, the present invention involves an apparatus for releasably gripping at least one elongated item and being used in pulling the elongated item through at least one space. The apparatus includes a body having a bore and a plurality of gripping members associated with the body. Each gripping member is movable relative to the body and capable of projecting generally inwardly into the bore. At least one gripping member includes at least two grippers, each gripper being capable of at least one among gripping and guiding the elongated item.

In various embodiments, the present invention involves an apparatus for releasably gripping at least one elongated item and being used in pulling the elongated item through at least one space. The apparatus includes a body having a bore and a plurality of gripping members pivotably mounted to the body. Each gripping member is capable of projecting generally inwardly into the bore and engaging at least one elongated item. The gripping members are each disposed upon carriers mounted to the body. At least one pair of the gripping members is disposed upon a common the carrier.

There are embodiments of the invention involving an apparatus for releasably gripping at least one elongated item and being used in pulling the elongated item through at least one space. The apparatus includes a body having a bore and a plurality of gripping members pivotably mounted to the body. Each gripping member is capable of projecting generally inwardly into the bore and engaging the elongated item. At least one biasing member is associated with at least one gripping member and is capable of providing biasing force upon the gripping member to at least partially restrict its pivoting in one direction.

In many embodiments, an apparatus for releasably gripping at least one elongated item and being used in pulling the elongated item through at least one space includes a body having a bore therethrough and a plurality of gripping members associated with the body. Each of the gripping members is capable of engaging at least one elongated item disposed in the bore. The apparatus includes a centering device is included that is capable of assisting in centering the elongated item in the bore.

Some embodiments of the present invention involve an apparatus for releasably gripping at least one elongated item and being used in pulling the elongated item through at least one space. The apparatus includes a body having a bore therethrough and is capable of being pulled through the at least one space. The elongated item is insertable into the bore. A plurality of gripping members is associated with the body. Each gripping member is movable relative to the body and capable of projecting generally inwardly into the bore and engaging at least one elongated item. At least one attachment device is engageable with the body and useful to facilitate pulling the body. The at least one attachment device allows clearance at the openings of the bore, whereby the openings are unobstructed by the attachment device and the apparatus is capable of gripping a non-end portion of the elongated item.

There are embodiments of the present invention that involve an apparatus for releasably gripping at least one elongated item and being used in pulling the elongated item through at least one space. The apparatus includes a body and a plurality of gripping members associated with the body. Each gripping member is capable of projecting generally outwardly from the body to engage the elongated item.

Many embodiments of the present invention involve an apparatus for releasably gripping at least one elongated item and being used in pulling the elongated item in at least one path. The apparatus includes at least two gripping devices, each gripping device having a body and a plurality of gripping members capable of engaging an elongated item. At least one connector is engageable between at least two axially aligned gripping devices. The connected gripping devices are capable of engaging the same elongated item.

Some embodiments of the present invention involve a method of releasably gripping an elongated item with a gripping device. The gripping device includes a body and a plurality of gripping members capable of projecting outwardly therefrom. Starting at the lower end of the body of the gripping device, an end of the elongated item is slid over the body. After the elongated item is in the desired position relative to the gripping device, the elongated item, relative to the body, is moved in the direction of the upper end of the body and/or the body, relative to the elongated item, is moved in the direction of the lower end of the body, causing at least two of the gripping members to grip the elongated item. The gripping device is pulled in a manner in which movement of the upper end of the body generally precedes movement of the lower end of the body.

There are embodiments of the present invention that involve a method of releasably gripping an elongated item with at least two gripping devices. The gripping devices are connected together axially with at least one connector so that the upper end of the first gripping device is located proximate to and generally aligned with the lower end of the second gripping device. An end of the elongated item is inserted into a bore of the first gripping device at the lower end of the first gripping device. The end of the elongated item is passed through the bore of the first gripping device and into an aligned bore of the second gripping device at the lower end thereof. The elongated item is gripped with grippers associated with at least one among the gripping devices.

In some embodiment, a method of releasably gripping an elongated item with at least two gripping devices includes connecting the gripping devices together aligned axially with a connector. An end of the elongated item is inserted over the first gripping device at the lower end of the first gripping device. The end of the elongated item is passed over the first gripping device and at least partially over the second gripping device. The elongated item is gripped with grippers projecting outwardly from the gripping devices.

Various embodiments of the present invention involve an apparatus capable of releasably engaging at least one elongated item so that the at least one elongated item may be pulled through at least one space. The apparatus includes a body having first and second opposite ends and a bore extending through the body from the first end to the second end. The elongated item is insertable into the bore from the first end of the body and removable from the bore through the second end of the body. A plurality of gripping members is associated with the body and capable of gripping and/or guiding the elongated item disposed within the bore. The gripping members allow movement of the elongated item into the bore from the first end of the body, through the bore and out the bore at the second end of the body.

There are embodiments of the present invention that involve an apparatus for releasably gripping at least one elongated item and being used in pulling the elongated item through at least one space. At least first and second body portions are releasably alignable to form a body. The body has a bore and is capable of being pulled through the space. The elongated item is at least partially insertable into the bore. A plurality of gripping members are associated with the body. At least some of the gripping member are capable of gripping the elongated item disposed within the bore.

In many embodiments, an apparatus for releasably gripping at least one elongated item and being used in pulling the elongated item through at least one space includes at least first and second body portions. The body portions are alignable together to form a bore extending at least partially therebetween. The elongated item is at least partially insertable into the bore. The body portions are capable of being pulled through the space. A plurality of gripping members projects inwardly into the bore from one or more body portion. Each gripping member is capable of gripping and/or guiding the elongated item disposed at least partially within the bore.

There are yet some embodiments of the present invention involving a method of releasably gripping an elongated item with at least one gripping device. The gripping device and elongated item are capable of being pulled through at least one path. At least first and second body portions are aligned together to form a body. At least one holder is engaged with the body portions. The elongated item is engaged with the gripping device. The gripping device and engaged elongated item are pulled through the path. The holder is disengaged from the body portions and the body portions are disengaged from the elongated item.

Accordingly, the present invention includes features and advantages which are believed to enable it to advance elongated item gripping technology. Characteristics and advantages of the present invention described above and additional features and benefits will be readily apparent to those skilled in the art upon consideration of the following detailed description of preferred embodiments and referring to the accompanying drawings.

BRIEF DESCRIPTION OF THE DRAWINGS

The following figures are part of the present specification, included to demonstrate certain aspects of presently preferred embodiments of the invention and referenced in the detailed description herein.

FIG. 1 is a partial cutaway view showing a gripping device having gripping members with multiple grippers according to an embodiment of the present invention;

FIG. 2 is a partial cutaway view showing a gripping device having an attachment device that allows the body to grip a non-end portion of an elongated item in accordance with an embodiment of the present invention;

FIG. 15 is a perspective view showing another embodiment of a non-rotatable gripping member;

FIG. 16 is a partial cutaway view showing the gripping member of FIG. 15 press fit into the body of an embodiment of a gripping device;

FIG. 17 is a partial cross-sectional view of the embodiment of FIG. 16; and

DETAILED DESCRIPTION OF PRESENTLY PREFERRED EMBODIMENTS

Figure 3A:
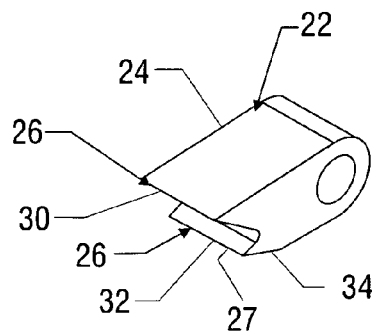
FIG. 3A is a perspective view showing an embodiment of a gripping member having multiple grippers.

Characteristics and advantages of the present invention and additional features and benefits will be readily apparent to those skilled in the art upon consideration of the following detailed description of presently preferred embodiments of the claimed invention and referring to the accompanying figures. It should be understood that the description herein and appended drawings, being of preferred embodiments, are not intended to limit the appended claims or the claims of any patent or patent application claiming priority to this application. On the contrary, the intention is to cover all modifications, equivalents and alternatives falling within the spirit and scope of the claims. Many changes may be made to the particular embodiments and details disclosed herein without departing from such spirit and scope.

In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout various portions (and headings) of this patent, the terms "invention", "present invention" and variations thereof are not intended to mean the invention of every possible embodiment of the invention or any particular claim or claims. Thus, the subject matter of each such reference should not be considered as necessary for, or part of, every embodiment of the invention or any particular claim(s) merely because of such reference. Also, it should be noted that reference herein and in the appended claims to components and aspects in a singular tense does not necessarily limit the present invention to only one such component or aspect, but should be interpreted generally to mean one or more, as may be suitable and desirable in each particular instance.

Referring initially to FIG. 1, an embodiment of a gripping device 10 capable of releasably gripping at least one elongated item (not shown) is shown. The illustrated gripping device 10 includes an attachment device 14, a body 18 and multiple gripping members 22 mounted in the body 18. The exemplary attachment device 14, which includes a wire rope 13 and a removable cap 16 threadably engageable with the body 18, is useful to facilitate pulling the gripping device 10, such as by connection to a tugging device (not shown).

The illustrated body 18 includes a bore 20 extending from the first end 18a to the second end 18b of the body 18. The gripping members 22 are capable of projecting into the bore 20 and engaging the elongated item(s). The exemplary gripping members 22 are disposed upon pins 15 mounted within cut-outs, or slots, 17 formed in the body 18 and are independently pivotable relative to the body 18 and each another. Further details of the construction and operation of the gripping device 10 of FIG. 1 as well as other embodiments of gripping devices in accordance with the present invention and other features are described in U.S. Pat. No. 6,883,782 entitled "Cable Clamping Apparatus and Method", issued on Apr. 26, 2005 and having a common assignee with the present patent, particularly the description at Column 4, line 4 through Column 7, line 35 and the accompanying drawings, and in U.S. patent application Ser. No. 11/527,011, entitled "Cable Clamping Apparatus and Method", filed concurrently herewith, and having a common assignee with the present patent, particularly the description at Pages 8-18 and the accompanying drawings, all of which are hereby incorporated by reference herein. It should be understood, however, that the features described above and incorporated by reference above are not required for or limiting upon the present invention, the appended claims or the claims of any patents claiming priority hereto.

Referring still to FIG. 1, in accordance with one independent aspect of the present invention, the bore 20 of the gripping device 10 may have any form and configuration capable of allowing at least part of the elongated item to be grippable by the gripping device 10. In the embodiment shown, the bore 20 is a passage extending through the body 18 of the gripping device 10. For some other examples, depending upon the embodiment, the bore may take the form of a space, area, hole, opening or orifice. The bore 20 may also have any desired cross-sectional shape. In the example shown, the bore 20 has a round cross-sectional shape. In other exemplary embodiments (not shown), the bore 20 may be formed with a cross-sectional shape that is square, rectangular, hexagonal, or include portions with differing or varying cross-sectional shapes. Furthermore, the bore 20 may be formed through or between multiple components (not shown). The present invention is thus not limited by the shape, configuration or orientation of the bore 20.

In another aspect, the present invention does not require an attachment device 14 with every embodiment. When included, the attachment device 14 may take any suitable form. For example, the attachment device may include one or more flexible mesh-like member (not shown), multiple flexible wire cables or other components. Thus, the present invention is not limited by the inclusion or form of the attachment device 14.

In accordance with another independent aspect of the present invention, the elongated item(s) 23 that may be gripped by the gripping device 10 of the present invention may have any suitable form, configuration and construction. Examples of elongated items are cables, wires, tubular members, protrusions or extensions of other structures or items, or anything else that may be grippable by the gripping device 10. The elongated item 23 may have a round, square, rectangular or other suitable cross-sectional shape. The present invention is thus not limited in any way by the shape, form, nature, construction or any other aspect of the elongated item 23.

In the example of FIG. 1, the gripping device 10 is capable of gripping the end of the elongated item (not shown). However, in accordance with another independent aspect of the present invention, the gripping device 10 is not limited to gripping an end of the elongated item. The body 18 of the device 10 may be positioned on a non-end portion of the elongated item(s). Any suitable components and techniques may be used for engaging the gripping device 10 with a non-end portion of an elongated item. In the embodiment of FIG. 2, for example, the gripping device 10 includes an attachment device 14 having multiple connectors 19 extending from the body 18 around, or outside, the elongated item(s) 23. The illustrated connectors 19 are flexible wire cables 28 secured in anchor holes 25 formed in the wall 21 of the body 18. The connectors 19 are useful for facilitating pulling the gripping device 10 (and elongated item 23), such as by engagement with a tugging device (not shown). The illustrated gripping device 10 is thus useful for gripping a non-end part of the elongated item 23.

Referring back to FIG. 1, in accordance with another independent aspect of the present invention, the gripping members 22 of the illustrated embodiment include multiple grippers 26. The gripping members 22 and multiple grippers 26 may have any desired form, configuration and orientation. Furthermore, any desired number of grippers 26 may be included on a gripping member 22. In FIGS. 3A-D, for example, the gripping members 22 are teeth 24 and the grippers 26 are sharpened tips, or edges, 27. The tooth 24 of FIG. 3A, by comparison to the teeth 24 of FIGS. 3B-D, is smaller and has upper and lower tips 30, 32 positioned close together. The lower tip 32 is nearly as long as the upper tip 30. The tooth 24 includes a lower angled face 34 that allows the lower tip 32 to be angled only slightly downwardly relative to the upper tip 30.

Figure 3B:
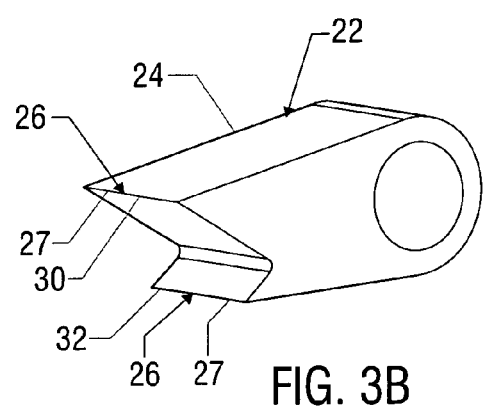
FIG. 3B is a perspective view showing another embodiment of a gripping member having multiple grippers.
Figure 3C:
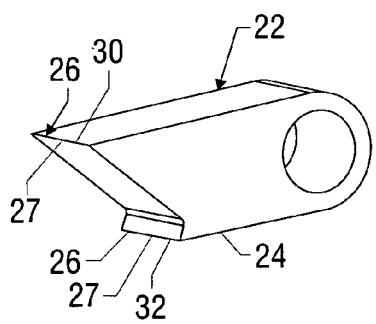
FIG. 3C is a perspective view showing another embodiment of a gripping member having multiple grippers.
Figure 3D:
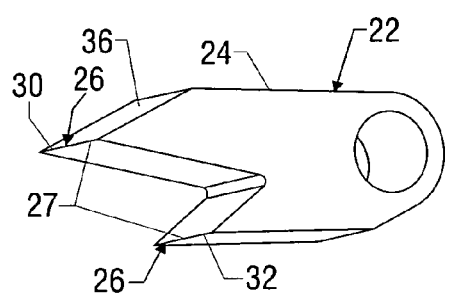
FIG. 3D is a perspective view showing yet another embodiment of a gripping member having multiple grippers.

By comparison to the tooth 24 of FIG. 3A, the tooth 24 of FIG. 3B is larger and has upper and lower tips 30, 32 spaced farther apart. The lower tip 32 is significantly shorter than the upper tip 30 and the lower tip 32 is angled farther downwardly relative to the upper tip 30. In FIG. 3C, the tooth 24 is longer and the upper and lower tips 30, 32 are spaced farther apart as compared to the tooth 24 of FIG. 3B. The lower tip 32 is even shorter than the upper tip 30, and angled even further downwardly relative to the upper tip 30. In FIG. 3D, the tooth 24 is longer than the tooth of FIG. 3C. The tooth 24 includes an upper angled face 36, causing the upper tip 30 to be angled downwardly relative to the lower tip 32.

Figure 4A:
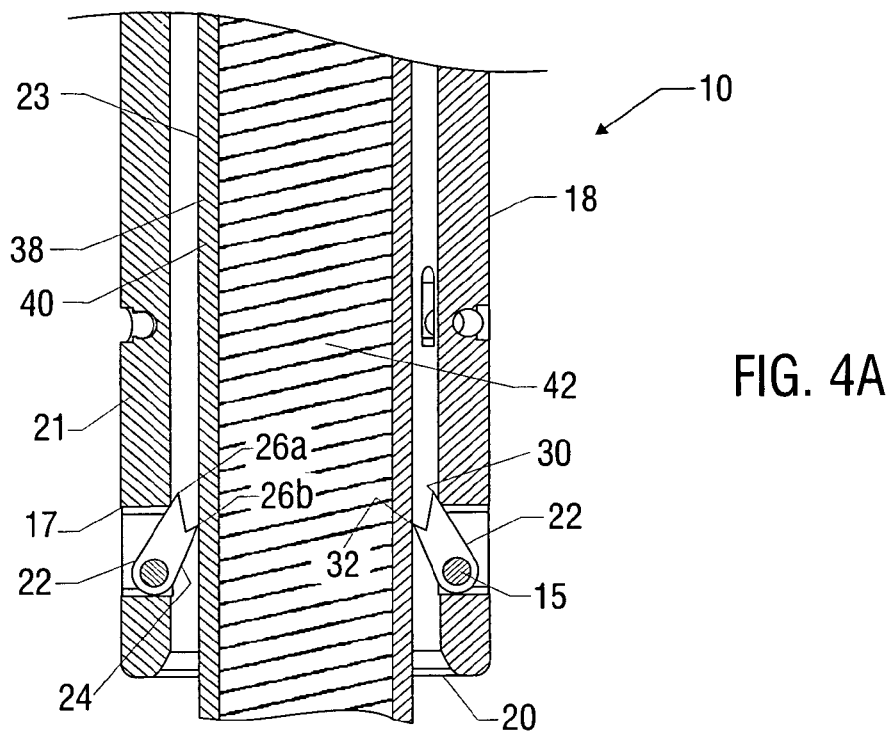
FIG. 4A is a partial cross-sectional view showing an embodiment of a gripping device having gripping members with multiple grippers in a first position.
Figure 4B:
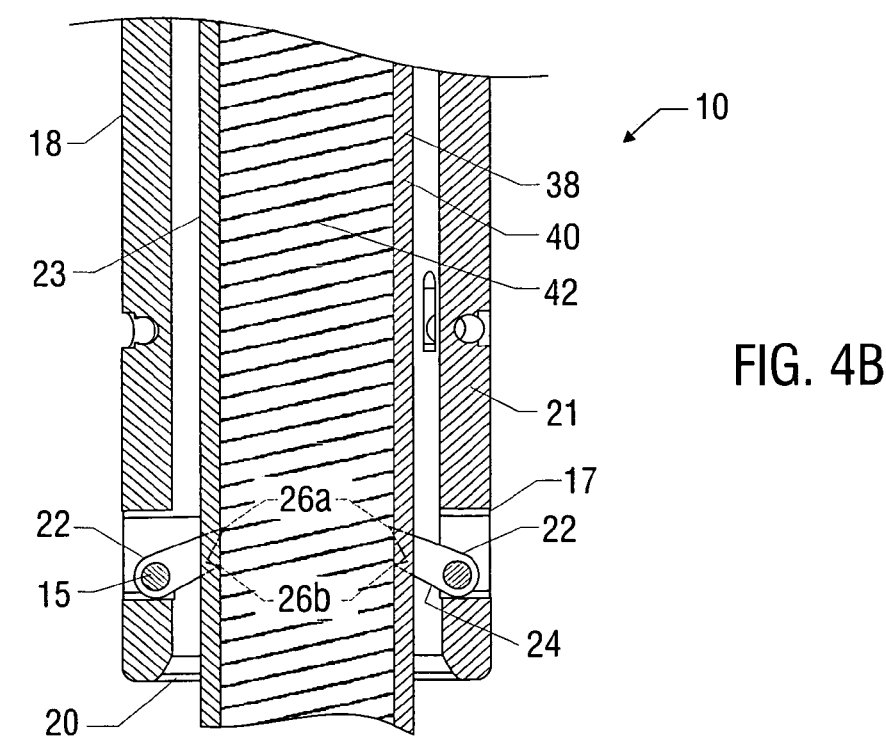
FIG. 4B is shows the embodiment of FIG. 4A with its grippers in a second position.

Multiple grippers 26 may be included on a gripping member 22 for any suitable purpose. In the embodiment of FIG. 4A, for example, upper and lower grippers 26a and 26b are both capable of "engaging" the illustrated elongated item 23, the lower gripper 26b merely guiding the elongated item 23 in the bore 20 to assist in centering the elongated item 23 in the bore 20, while the upper gripper 26a provides the desired penetration/gripping action. In this example, as shown in FIG. 4B, the upper grippers 26a of the illustrated gripping members 22 are capable of penetrating entirely through the outer layer 38, such as an insulation layer 40, of the elongated item 23 and penetrating partially into the inner core 42. For another example, the lower gripper 26b of the gripping member 22 may be useful to penetrate and grip larger diameter elongated items (not shown) while the upper gripper 26a penetrates and grips smaller diameter elongated items.

Figure 9:
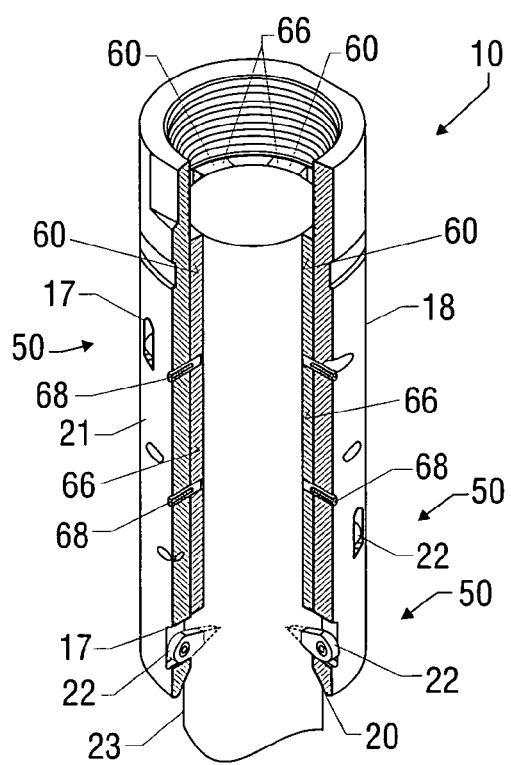
FIG. 9 is a partial cutaway view showing another embodiment of a gripping device having a centering device.

However, the gripping device 10 may be configured with any desired form and quantity of gripping members 22. For example, various embodiments of the present invention include gripping members 22 with only a single gripper 26 (see e.g. FIGS. 2, 9-10). For another example, the gripping device 10 may include some gripping members 22 having multiple grippers 26 and others having a single gripper 26. For yet another example, the device 10 may include gripping members 22 having more than two grippers 26.

Figure 5:
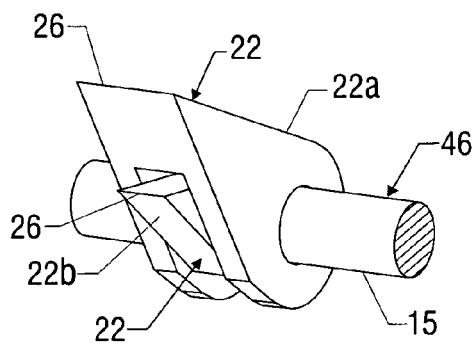
FIG. 5 is a perspective view showing an embodiment of a pair of associated gripping devices disposed upon a common carrier in accordance with an embodiment of the present invention.

Referring now to FIG. 5, some embodiments of the present invention include multiple associated gripping members 22. In the example shown, first and second gripping members 22a and 22b are disposed and independently pivotable upon a common carrier 46, such as a pin 15. The illustrated first gripping member 22a is larger than and substantially surrounds the second gripping member 22b. When the gripping members 22a, 22b of this embodiment are disposed within a gripping device 10, the first gripping member 22a extends farther into the bore of the body (not shown) to engage smaller diameter elongated items (not shown), while the second gripping member 22b is capable of gripping larger diameter elongated items.

Figure 6:
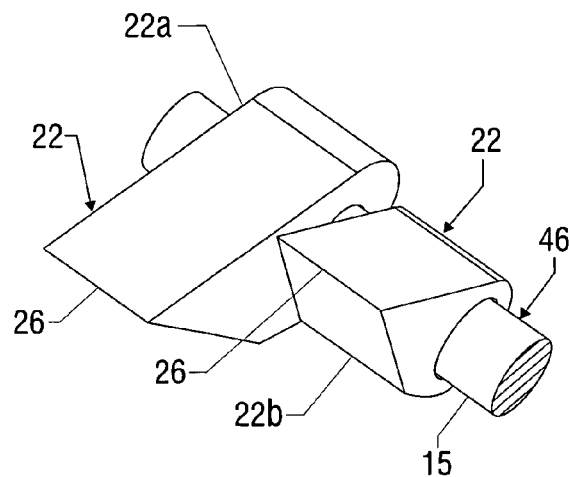
FIG. 6 is a perspective view showing another embodiment of a pair of associated gripping devices disposed upon a common carrier in accordance with an embodiment of the present invention.

However, associated gripping members 22 may be arranged in any desired manner and for any desired purpose. For example, in some applications, the first gripping member 22a may be useful for sufficiently penetrating an elongated item (not shown) having a thick insulation or outer layer. For another example, referring to FIG. 6, the independently pivotable gripping members 22a and 22b are arranged side-by-side on a common carrier 46, such as a pin 15. In this embodiment, the gripping member 22a is capable of gripping smaller elongated items (not shown), while the gripping member 22b is capable of gripping larger elongated items (not shown).

Figure 7:
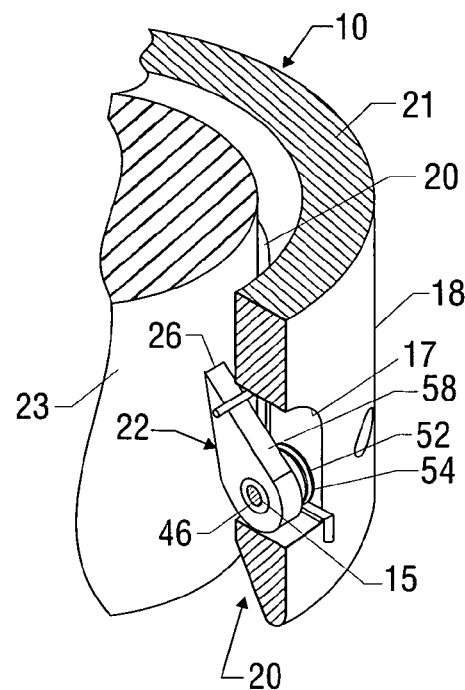
FIG. 7 is a partial cutaway view showing an embodiment of a gripping device having a biasing member associated with a gripping member.

In another independent aspect of the present invention, the gripping members 22 may be retained or positioned in the body 18 in any desired manner. For example, the gripping member 22 of FIG. 7 is shown spring-biased off the wall 21 of the body 18. In this embodiment, a biasing member 52, such as a torsion spring 54, is disposed over the carrier 46 and provides spring force upon the back 58 of the gripping member 22. Any desired spring force may be provided on the gripping member 22 for any desired purpose. For example, the spring force may be sufficient to maintain the position of the gripper(s) 26 of the gripping member 22 in the bore 20 slightly off the wall 21 of the body 18 to facilitate engagement of the gripping member 22 with the elongated item 23.

Figure 8:
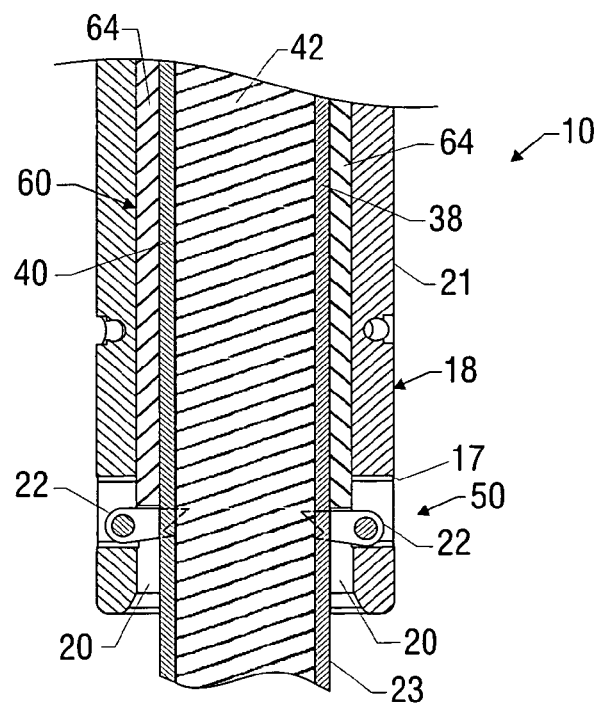
FIG. 8 is a partial cross-sectional view showing an embodiment of a gripping device having a centering device.

Referring now to FIG. 8, in yet another independent aspect of the present invention, the gripping device 10 may include a centering device 60 capable of assisting in centering the elongated item 23 in the bore 20. The centering device 60 may take any suitable form and configuration. In the embodiment shown, the centering device 60 includes a series of centering sleeves 64 formed, or disposed, within the bore 20. For example, the centering sleeve 64 may be press fit into position in the bore 20. Each illustrated centering sleeve 64 extends around the inner circumference of the bore 20 between adjacent rows, or circular bands, 50 of gripping members 22 and assists in generally centering the elongated item 23 in the bore 20. If desired, the centering sleeve(s) 64 may have a particular thickness, such as to prevent the gripping members 22 from penetrating the elongated item 23 more than desired.

In use of this embodiment, the gripping members 22 are capable of cutting through the outer layer(s) 38 and sufficiently engaging the inner core 42 of the properly centered elongated item 23 without undesirably damaging the inner core 42. For example, an elongated item 23 having an inner core 42 that includes a bundle a of malleable copper wires may be deformed, dimpled or cut by the gripping members 22 to mechanically hookingly engage some of the wires without undesirably damaging the inner core 42.

In another example, the centering device 60 may include multiple guide studs or set screws (not shown) extending through the wall 21 of the body 18 and into the bore 20 to assist in centering the elongated item. In yet another example, referring to FIG. 9, the centering device 60 may include a series of guide rails 66 formed or disposed with the bore 20. The illustrated guide rails 66 extend axially in the bore 20 between axially aligned gripping members 22 and assist in generally centering the elongated item 23. In this embodiment, the guide rails 66 are connected to the body 18 by set screws 68. However, any connection mechanism or formation technique may be used. If desired, the guide rails 66 may have a particular thickness, such as to prevent gripping members 22 from penetrating the elongated item 23 more than desired.

Figure 10:
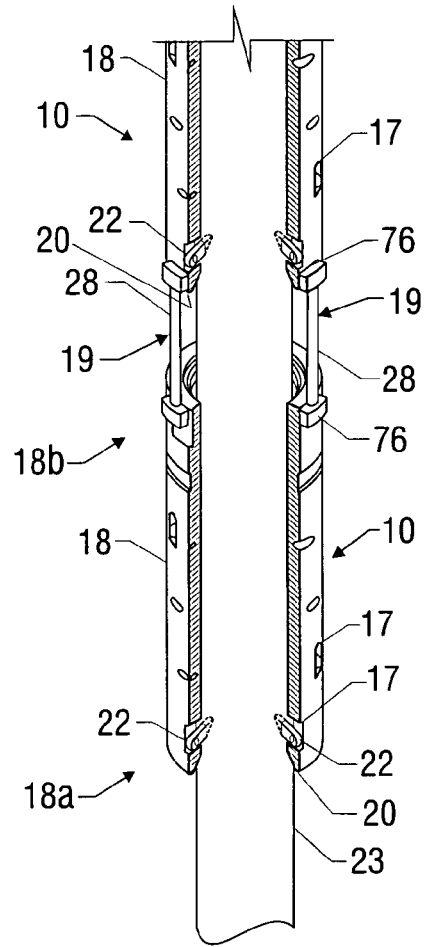
FIG. 10 is a partial cutaway view showing two gripping device axially connected with a connector in accordance with an embodiment of the present invention.

Now referring to FIG. 10, in another independent aspect of the present invention, multiple gripping devices 10 may be axially connectable together for any desired purpose, such as to provide increased gripping or pulling strength and/or movement flexibility through the path or space within which the elongated item 23 is moved. Any suitable arrangement of components may be used for axially connecting any desired number of gripping devices 10. For example, multiple elongated connectors 19 may be used for connecting multiple gripping devices 10. In the embodiment shown, three connectors 19, such as flexible wire cables 28, are connected between upper and lower gripping devices 10 by weld 76, respectively. However, any components and techniques may be used for axially connecting multiple gripping devices 10. For example, the connectors 19 may be flexible mesh-like members (not shown) extending between upper and lower gripping devices 10. In some embodiments, the connectors 19 may be releasably engageable with one or more of the gripping devices 10 that they connect. For another example, the connectors may extend from anchor holes (e.g. anchor holes 25 of FIG. 2) formed in the wall 21 of the body 18 of one or multiple gripping devices 10.

In an example operation of the embodiment of FIG. 10, the elongated item 23 is inserted into the bore 20 of the lowermost gripping device 10 at the first end 18a of the body 18 thereof. In moving the elongated item 23 into position, the elongated item 23 is passed through the lower bore 20 and into the bore 20 of the upper gripping device 10 to the desired position therein. The elongated item 23 will generally cause any gripping members 23 in its path to pivot back or toward into their respective slots 17, allowing passage of the elongated item 23 thereby. After the elongated item 23 is positioned in the respective bores 20, movement of the elongated item 23 back in the direction of the first end 18a of the lower body 18, or movement of the gripping devices 10 in the opposite direction, will generally cause at least some of the gripping members 22 to grip the elongated item 23. Thereafter, as the connected gripping devices 10 of this embodiment are pulled generally in the direction of the upper end of the uppermost gripping device 10, the elongated item 18 is pulled along. During movement, the connectors 19 extending between the gripping devices 10 are capable of bending or flexing to accommodate any encountered curves, turns or other non-linear paths.

When it is desired to remove the elongated item 23 from the illustrated arrangement of gripping devices 10, the upper end (not shown) of the bore 20 of the uppermost gripping device 10 is cleared of any obstruction, such as an attachment device (not shown). The elongated item 23 is moved in the direction of that upper end (away from the first end 18a of the body 18 of the lowermost gripping device 10) to separate it from the gripping devices 10. If desired or necessary, the elongated item 23 may be cut below the lowermost gripping device 10 and the cut (gripped) portion thereof moved out of the gripping devices 10.

Figure 11:
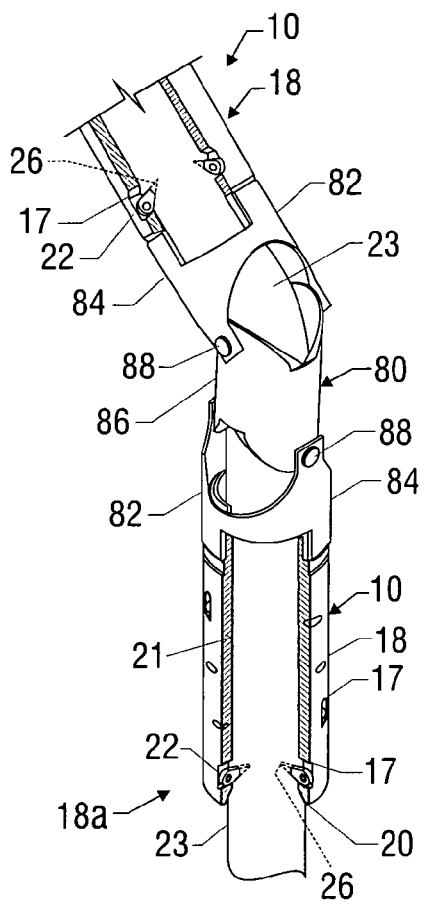
FIG. 11 is a partial cutaway view showing two gripping device axially connected with a connector in accordance with another embodiment of the present invention.
Figure 12:
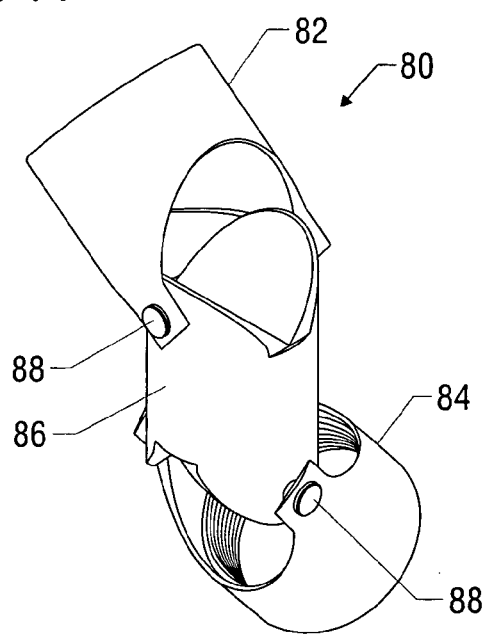
FIG. 12 is a perspective view showing the embodiment of connector of FIG. 11.

In another example, as shown in FIG. 11, a universal joint 80 is engaged between multiple gripping devices 10. The universal joint 80 may have any suitable form, configuration and construction. As shown in FIG. 12, the illustrated universal joint 80 is constructed of metal or plastic, and includes upper and lower arms 82, 84 hingably connected together by a central member 86, such as with hinge pins 88. The illustrated upper and lower arms 82, 84 are threadably engageable with the respective gripping devices 10. In an example embodiment of a method of use of the universal joint 80, it may be used generally similarly as described above with respect to the embodiment of FIG. 10.

Figure 13:
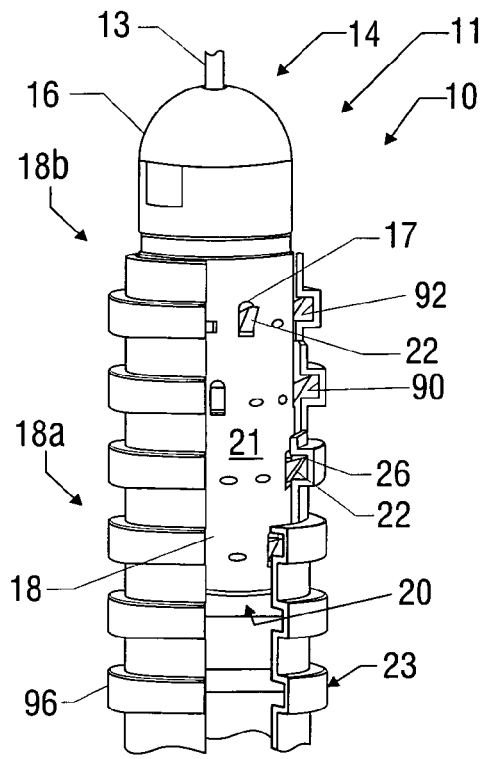
FIG. 13 is a partial cutaway view showing a gripping device having outwardly projecting gripping members in accordance with an embodiment of the present invention.

Referring to FIG. 13, in another independent aspect of the present invention, the gripping device 10 may include one or more gripping members 22 capable of projecting outwardly from the body 18 to grip at least one elongated item 23 disposed at least partially over the body 18. The gripping device 10 and gripping members 22 of these embodiments may take any suitable form, configuration and arrangement and may engage the elongated item in any desired manner. For example, the gripping device 10 and gripping members 22 may be in any of the forms, or include any of the features, described above or incorporated by reference above to the extent they may be used with gripping members 22 capable of projecting outwardly from the body 18 and engaging at least one elongated item 23.

In the embodiment shown, the gripping members 22 are independently pivotably mounted on pins (not shown) disposed in slots 17 formed in the body 18. Each gripping member 22 is capable of allowing the one-way passage of at least one elongated item 23 over the body 18 and thereafter projecting outwardly from the body 18 to engage an inside portion 90 of the elongated item 23. In this embodiment, each gripping member 22 grips an inside portion 90 of the elongated item 23. The inside portion 90 may be any part of the elongated item 23 and may take any form and configuration. In the example shown, the elongated item 23 is a corrugated tube 96 constructed of metal or plastic and the inside portion 90 is a channel 92. In another example, the inside portion 90 may be a wall (not shown). The present invention is not limited by the form, configuration and construction of the inside portion 90 of the elongated item 23.

Still referring to the embodiment of FIG. 13, the illustrated gripping device 10 includes a bore 20, such as to allow access to the gripping members 22 and pins (not shown). In some embodiments, the gripping device 10 may be configured with reversible gripping members 22 capable of being movable between outwardly projecting positions to engage an elongated item 23 disposed over the body 18 and inwardly projecting positions to engage an elongated item 23 inserted into the bore 20. Alternately, the gripping device 10 may include separate sets of oppositely projectable gripping members 22. However, the present embodiment does not require a bore 20 or the capability of inwardly projecting gripping members 22. If desired, multiple gripping devices 10 with outwardly projecting gripping members 22 may be axially connected, similarly as described above with respect to FIGS. 10-12.

In an example operation of the embodiment of FIG. 13, the gripping members 22 allow placement of the elongated item 23 over the body 18 from the first end 18a of the body 18 toward the second end 18b of the body 18. After the elongated item 23 is placed over at least part of the body 18, movement of the elongated item 23 back in the direction of the first end 18a of the body, or movement of the gripping device 10 in the opposite direction, will generally cause the illustrated gripping members 22 to grip an inside portion 90 of the elongated item 23. Thereafter, pulling the gripping device 10 from or in the direction of its first end 11 will pull the elongated item 18 along the path, or through the desired space. To remove the elongated item 23 from the illustrated gripping device 10, the removable cap 16 is disconnected from the body 18 and the elongated item 23, or a cut portion thereof, is moved in the direction of the first end 11 of the gripping device 10 until it fully separates from the gripping device 10.

Figure 14:
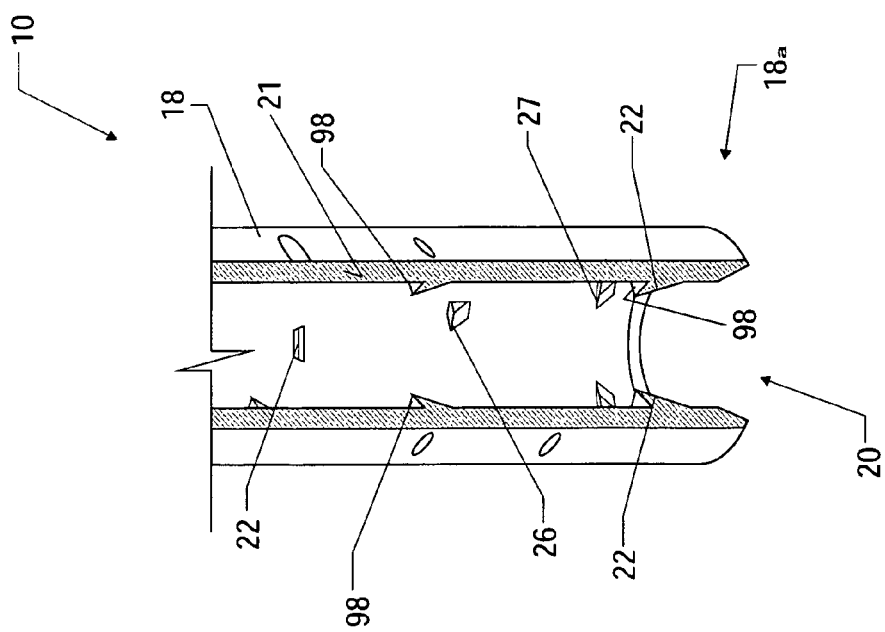
FIG. 14 is a partial cutaway view showing a gripping device having non-rotatable gripping members in accordance with another embodiment of the present invention.

Referring now to FIG. 14, in another independent aspect of the present invention, the gripping members 22 may be fixed or non-rotatable. Non-rotatable or fixed gripping members may have any desired form, configuration and orientation. In the embodiment shown, for example, the gripping members 22 are non-rotatable gripping members 98 integrally formed as part of the body 18. The gripping members 98 have a fixed position and angular orientation. For another example, referring to the embodiment of FIGS. 15-17, the illustrated non-rotating gripping member 98 has a base portion 94 that is press fit, or otherwise engaged, in the slot 17. In still further examples, the non-rotatable gripping members 98 may be welded to the body 18 or connectable in another suitable manner.

The non-rotatable gripping member(s) 98 may have any desired arrangement of grippers 26 oriented at any desired angular orientation. In the embodiment of FIG. 14, for example, the gripping members 98 each have a single gripper 26 extending into the bore 20 at an angle of approximately forty-five degrees (45°) relative to the central axis of the bore 20.

In still another aspect, the gripping device 10 may include one or more fixed or non-rotatable gripping members (not shown) projectable outwardly from the body 18, such as to grip at least one elongated item 23 disposed at least partially over the body 18. For example, the non-rotatable gripping members 98 of FIG. 14 or 15 may be included in the embodiment of FIG. 13.

In yet another aspect, some or all of the gripping members 22 may be removable and replaceable. For example, there may be applications where it is desirable to replace a non-rotatable gripping member (not shown) having one or more gripper of a particular size and angular orientation with a gripping member having different dimensions. In still a further aspect, a gripping device 10, such as the embodiment of FIG. 18, may include some gripping members 22 that are moveable or rotatable, such as gripping members 29, and other gripping members 22 that are fixed or non-rotatable, such as members 98.

Figure 18:
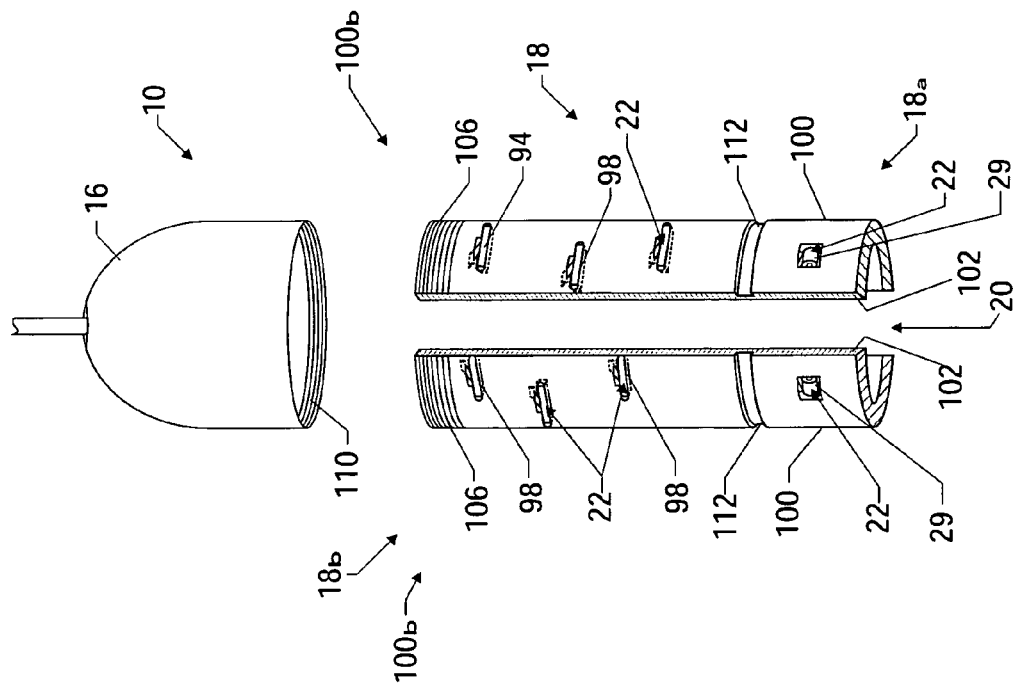
FIG. 18 is a disassembled side view of an embodiment of a gripping device having some gripping members that are movable relative to the body of the gripping device and other non-movable gripping members.

Referring now to FIG. 18, in yet another independent aspect, the body 18 of the gripping device 10 may take any desired form. For example, the body 18 may be constructed of multiple components, such as in a "clam shell" or "split body" arrangement. In the illustrated embodiment, the body 18 is formed with first and second corresponding body portions 100. The wall 102 of each illustrated body portion 100 is alignable with the corresponding wall 102 of the other body portion 100. When the body portions 100 of this example are aligned, the bore 20 is formed therebetween.

The body portions 100 may be held together in any suitable manner and with any desired holder. In the embodiment shown, each body portion 100 has a set of female thread portions 106 alignable with those of the other body portion 100 when the body portions 100 are aligned. The aligned female thread portions 106 are matable with a set of male threads 110 disposed inside the cap 16 to secure the body portions 100 together. In other exemplary embodiments, the cap (not shown) may instead be spring-biased into and out of engagement with the body portions 100, such as in the form of a quick release coupling. Instead or in addition, each body portion 100 may include one or more groove portion 112 disposed in the outer surface of the wall 102. In the example shown, a single groove portion 112 is located proximate to the end 100b of each body portion 100. However, multiple groove portions may be located at different locations on the wall 102. When the body portions 100 are aligned, the corresponding groove portions 112 align and are capable of seating an anchor member (not shown), such as a high strength elastomeric ring or cable. Thus, the body portions 100 may have any suitable form, configuration and quantity and be used with any desired holder.

In an example operation of the embodiment of FIG. 18, the body portions 100 of the gripping device 10 are aligned and the cap 16 threaded over the end 100b. If desired, as a secondary connection, an elastomeric ring may be slit onto the body 18 and into the aligned groove portions 112. An end of the elongated item (not shown) is inserted into the bore 20. At least some of the gripping members 22 are engaged with the elongated item. As the gripping device 10 is pulled in the direction of the cap 16, the elongated item is pulled along. When it is desired to remove the elongated item from the gripping device 10, the cap 16 is unscrewed from the body portions 100. The body portions 100 are disengageable from the elongated item without having to push the elongated item through the bore 20. If the elongated item is cut, the cut (gripped) portion, or stub, will be separable from the gripping device 10 without having to push it out through the bore 20.

Preferred embodiments of the present invention thus offer advantages over the prior art and are well adapted to carry out one or more of the objects of the invention. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein and the appended drawings and claims.

The methods described above and claimed herein and any other methods which may fall within the scope of the appended claims can be performed in any desired suitable order and are not necessarily limited to the sequence described herein or as may be listed in the appended claims. Further, the methods of the present invention do not necessarily require use of the particular embodiments shown and described in the present application, but are equally applicable with any other suitable structure, form and configuration of components.

While preferred embodiments of the invention have been shown and described, many variations, modifications and/or changes of the apparatus and methods of the present invention, such as in the components, details of construction and operation, arrangement of parts and/or methods of use, are possible, contemplated by the patentee, within the scope of the appended claims, and may be made and used by one of ordinary skill in the art without departing from the spirit or teachings of the invention and scope of appended claims. Thus, all matter herein set forth or shown in the accompanying drawings should be interpreted as illustrative and the scope of the invention and the appended claims should not be limited to the embodiments described and shown herein.

The invention claimed is:

1. An apparatus for releasably gripping at least one elongated item and being used in pulling the elongated item through at least one space, the apparatus comprising:
   a body having a bore therethrough and being capable of being pulled through the at least one space, wherein the elongated item is at least partially insertable into said bore; and
   a plurality of gripping members associated with said body, each said gripping member being pivotable and capable of projecting generally inwardly into said bore, wherein at least one said gripping member includes at least two grippers, each said gripper being capable of at least one among gripping and guiding the elongated item.

2. The apparatus of claim 1 wherein each said gripping member is independently moveable relative to said body and said other gripping members.

3. The apparatus of claim 2 wherein each said gripper of said at least one gripping member differs from said other at least one gripper of said gripping member in at least one among length and angular orientation, further wherein a first said gripper of said gripping member is capable of guiding the elongated item in said bore to assist in centering the elongated item in said bore and a second said gripper of said gripping member is capable of gripping the elongated item.

4. The apparatus of claim 2 wherein a first said gripper of said gripping member is capable of gripping small diameter elongated items in said bore and a second said gripper of said gripping member is capable of gripping larger diameter elongated items in said bore.

5. The apparatus of claim 2 wherein each said gripper of said gripping member is configured to extend into said bore a different distance as compared to said other at least one gripper of said gripping member.

6. The apparatus of claim 1 wherein each said gripping members of said plurality of gripping members includes multiple grippers.

7. The apparatus of claim 1 wherein said gripping members are teeth pivotably mounted to said body, each said tooth includes first and second said grippers, said grippers being sharp tips capable of penetrating the elongated item.

8. The apparatus of claim 1 further including a centering device capable of assisting in centering the elongated item in said bore.

9. The apparatus of claim 8 wherein said centering device includes at least one among at least one centering sleeve and at least one axially-extending rail disposed within said bore.

10. The apparatus of claim 1 wherein at least some said gripper members are capable of gripping the elongated item at a non-end portion of the elongated item.

11. The apparatus of claim 1 wherein at least one pair of said plurality of gripping members is disposed upon a common carrier mounted in said body.

12. The apparatus of claim 1 wherein at least one said gripping member includes an angled face associated with at least one said gripper of said gripping member, said angled face capable of decreasing the angular orientation of said gripper relative to at least one other said gripper of said gripping member.

13. An apparatus for releasably gripping at least one elongated item and being used in pulling the elongated item through at least one space, the apparatus comprising:
   a body having a bore therethrough and being capable of being pulled through the at least one space, wherein the elongated item is at least partially insertable into said bore; and
   a plurality of gripping members pivotably mounted to said body, each said gripping member being capable of projecting generally inwardly into said bore and engaging at least one elongated item, wherein said gripping members are disposed upon carriers mounted to said body, further wherein at least one pair of said gripping members is disposed upon a common said carrier and each said gripping member among each said pair of gripping members is independently moveable relative to the other said gripping member of said pair.

14. The apparatus of claim 13 wherein said carriers are pins.

15. The apparatus of claim 14 wherein all of said gripping members of said plurality of gripping members are arranged in pairs disposed upon common said pins, respectively.

16. The apparatus of claim 13 wherein said at least one pair of gripping members includes first and second gripping members, said first gripping member being disposed at least partially around said second gripping member on said common carrier and capable of extending farther into said bore than said second gripping member.

17. The apparatus of claim 13 wherein said at least one pair of gripping members includes first and second gripping members, said first gripping member being disposed adjacent to said second gripping member on said common carrier and capable of extending farther into said bore than said second gripping member.

18. An apparatus for releasably gripping at least one elongated item and being used in pulling the elongated item through at least one space, the apparatus comprising:
   a body having a bore therethrough and being capable of being pulled through the at least one space, wherein the elongated item is at least partially insertable into said bore;
   a plurality of gripping members pivotably mounted to said body, each said gripping member being capable of projecting generally inwardly into said bore and engaging the elongated item; and
   a plurality of biasing members associated with at least one said gripping member, said plurality of biasing members being capable of providing biasing force upon said at least one gripping member to at least partially restrict pivoting of said at least one gripping member in one direction.

19. The apparatus of claim 18 wherein said at least one biasing member is capable of biasing said associated gripping member into said bore to facilitate engagement of said gripping member with an elongated item in said bore.

20. The apparatus of claim 19 wherein each said gripping member is associated with a said biasing member, each said associated gripping member and biasing member being disposed upon a common carrier disposed within said body.

21. The apparatus of claim 20 wherein at least some of said gripping members each include at least two grippers.

22. The apparatus of claim 19 further including a centering device capable of assisting in centering the elongated item in said bore.

23. An apparatus for releasably gripping at least one elongated item and being used in pulling the elongated item through at least one space, the apparatus comprising:
   a body having a bore therethrough and being capable of being pulled through the at least one space, wherein the elongated item is at least partially insertable into said bore;
   a plurality of gripping members associated with said body, each said gripping member being moveable into said bore and capable of engaging at least one elongated item disposed in said bore; and
   at least one centering device disposed at least partially within said bore and capable of assisting in centering the elongated item in said bore.

24. The apparatus of claim 23 wherein said centering device includes at least one centering sleeve disposed within said bore.

25. The apparatus of claim 23 wherein said gripping members are independently pivotably moveable relative to said body, further wherein at least one of said gripping members includes multiple grippers, each said gripper being capable of at least one among guiding and gripping an elongated item.

26. The apparatus of claim 23 wherein said body has a generally cylindrical shape and includes a wall, further wherein said centering device includes at least two studs extending through said wall of said body into said bore.

27. The apparatus of claim 23 wherein said body has a generally cylindrical shape and includes a wall, further wherein said centering device includes at least two screws extending through said wall of said body into said bore.

28. The apparatus of claim 23 wherein said centering device include at least two axially-extending rails disposed within said bore.

29. An apparatus for releasably gripping at least one elongated item and being used in pulling the elongated item through at least one space, the apparatus comprising:
   a body being capable of being pulled through the at least one space, said body having first and second non-adjacent opposite ends and a bore extending through said body from said first end to said second end, wherein the elongated item is insertable into and through said bore;
   a plurality of gripping members associated with said body, each said gripping member being capable of projecting generally inwardly into said bore and engaging at least one elongated item; and
   at least one attachment device engageable with said body and being useful to facilitate pulling said body, said attachment device allowing clearance at the openings of said bore2, whereby said openings of said bore are unobstructed by said attachment device so that the apparatus is capable of gripping a non-end portion of the elongated item.

30. The apparatus of claim 29 wherein said attachment device includes at least one among at least one cable and at least one mesh-like member.

31. An apparatus for releasably gripping at least one elongated item and being used in pulling the elongated item through at least one space, the apparatus comprising:
   a body; and
   a plurality of gripping members associated with said body, wherein said gripping members are moveable from said body to outside said body and are capable of projecting generally outwardly from said body to engage at least one elongated item disposed at least partially over said body.

32. The apparatus of claim 31 wherein each said gripping member is capable of gripping an inside portion of the elongated item.

33. The apparatus of claim 32 wherein the elongated item is a corrugated tube.

34. The apparatus of claim 32 wherein at least one said gripping member is movable relative to said body.

35. The apparatus of claim 31 wherein at least one said gripping member is non-movable relative to said body.

36. The apparatus of claim 31 wherein at least one said gripping member includes multiple grippers, each said gripper being capable of at least one among guiding and gripping an elongated item.

37. An apparatus for releasably gripping at least one elongated item and being used in pulling the elongated item in at least one path, the apparatus comprising:
   at least two gripping devices, each said gripping device including a body having an upper end, a lower end, a bore extending therebetween and a plurality of gripping members associated with said body and capable of engaging an elongated item disposed within said bore thereof, wherein said upper end of said body of a first said gripping device is axially alignable with said lower end of said body of a second said gripping device to axially align said respective bores; and
   at least one connector engageable between at least two axially aligned said gripping devices, whereby said at least two connected gripping devices are capable of engaging the same elongated item.

38. The apparatus of claim 37 wherein said connector is capable of providing a bend between said at least two connected gripping devices.

39. The apparatus of claim 38 wherein said connector includes at least two flexible cables.

40. The apparatus of claim 38 wherein said connector includes a universal joint.

41. The apparatus of claim 38 wherein said connector is releasable from at least one among said at least two gripping devices.

42. The apparatus of claim 38 wherein each said gripping member is capable of protruding outwardly from its respective associated said body and gripping an inner portion of the elongated item.

43. The apparatus of claim 37 wherein each said body includes a bore therethrough, wherein the elongated item is at least partially insertable into said bore of each said body, further wherein said gripping members are independently piovotably movable in said body and capable of projecting generally inwardly into said bore.

44. The apparatus of claim 43 wherein at least one of said gripping members includes multiple grippers, each said gripper being capable of at least one among guiding and gripping an elongated item in said bore.

45. A method of releasably gripping an elongated item with a gripping device, the gripping device and elongated item to be pulled through at least one path, the gripping device including a body and a plurality of gripping members moveable from the body to outside the body and capable of projecting outwardly from the body, the method comprising:
   starting at the lower end of the body of the gripping device, sliding an end of the elongated item over the body;
   after the elongated item is in the desired position relative to the gripping device, moving at least one among the elongated item, relative to the body, in the direction of the upper end of the body, and the body, relative to the elongated item, in the direction of the lower end of the body, causing at least two of the gripping members to grip the elongated item; and
   pulling the gripping device in a manner in which movement of the upper end of the body generally precedes movement of the lower end of the body, whereby the elongated item is pulled along with the body.

46. A method of releasably gripping an elongated item with at least two gripping devices, the gripping devices and elongated item to be pulled through at least one path, the method comprising:
   with at least one connector, connecting the at least two gripping devices together aligned axially, whereby the upper end of the first gripping device is located proximate to and generally aligned with the lower end of the second gripping device;
   inserting an end of the elongated item into a bore of the first gripping device at the lower end of the first gripping device;
   passing the end of the elongated item through the bore of the first gripping device and into an aligned bore of the second gripping device at the lower end thereof; and
   gripping the elongated item with grippers associated with at least one among the at least two gripping devices.

47. The method of claim 46 further including the at least one connector changing its orientation to provide at least one bend between the first and second gripping devices, whereby the gripping devices and elongated item may be moved through a non-linear path.

48. The method of claim 46 further including the at least one connector moving between linear and non-linear positions to allow the gripping devices and elongated item to be moved through a path that includes at least one non-linear portion.

49. The method of claim 48 further including pulling at least one of the gripping devices through the at least one path, and after reaching a desired destination, moving the elongated item through the bores of the first and second gripping devices to disengage the elongated item from the gripping devices.

50. The method of claim 49 further including cutting the elongated item below the lower end of the first gripping device and discharging the cut portion of the elongated item from the at least two gripping devices.

51. The method of claim 50 further including releasably threadably engaging at least one connector with at least one among the first and second gripping devices.

52. The method of claim 46 wherein a force is applied to cause gripping members of each gripping device to grip the elongated item.

53. A method of releasably gripping an elongated item with at least two gripping devices, the gripping devices and elongated item to be pulled through at least one path, the method comprising:
   with at least one connector, connecting the at least two gripping devices together aligned axially, whereby the upper end of the first gripping device is located proximate to and generally aligned with the lower end of the second gripping device;
   inserting an end of the elongated item over the first gripping device at the lower end of the first gripping device;
   passing the end of the elongated item over the first gripping device;
   passing the end of the elongated item at least partially over the second gripping device starting at the lower end thereof; and
   gripping the elongated item with grippers projecting outwardly from the at least two gripping devices.

54. An apparatus capable of releasably engaging at least one elongated item so that the at least one elongated item may be pulled through at least one space, the apparatus comprising:
   a body having first and second opposite ends and a bore extending through said body from said first end to said second end, the at least one elongated item being insertable into said bore from said first end of said body and removable from said bore through said second end of said body; and
   a plurality of gripping members associated with said body, moveable into said bore and capable of at least one among gripping and guiding the elongated item disposed within said bore, said plurality of gripping members allowing movement of the at least one elongated item into said bore from said first end of said body, through said bore and out said bore at said second end of said body.

55. The apparatus of claim 54 wherein said plurality of gripping members are non-movable relative to said body.

56. The apparatus of claim 55 wherein said plurality of gripping members are integrally formed into said body.

57. The apparatus of claim 55 wherein said plurality of gripping members are press fit into said body.

58. The apparatus of claim 54 wherein said plurality of gripping members includes at least one gripping member that is pivotably movable relative to said body and at least one gripping member that is non-movable relative to said body.

59. The apparatus of claim 54 wherein at least one said gripping member includes at least two grippers, each said gripper being capable of at least one among gripping and guiding the elongated item.

60. The apparatus of claim 54 further including a centering device capable of assisting in centering the elongated item in said bore.

61. The apparatus of claim 54 wherein at least some said gripper members are capable of gripping the elongated item at a non-end portion of the elongated item.

62. An apparatus for releasably gripping at least one elongated item and being used in pulling the elongated item through at least one space, the apparatus comprising:
at least first and second body portions releasably alignable longitudinally to form a body,
said body having a bore and being capable of being pulled through the at least one space, wherein the elongated item is at least partially insertable into said bore; and
a plurality of gripping members associated with each said body portion, at least some of said gripping member being capable of gripping the elongated item disposed within said bore.

63. The apparatus of claim 62 further including a cap engageable with said at least first and second body portions and capable of releasably holding said body portions in aligned relationship.

64. The apparatus of claim 62 further including at least one groove portion formed in each of said at least first and second body portions and capable of seating at least one ring-like member when said at least first and second body portions are aligned.

65. The apparatus of claim 62 wherein said plurality of gripping members are non-movable relative to said body.

66. The apparatus of claim 62 wherein said plurality of gripping members includes at least one gripping member that is pivotably movable relative to said body.

67. The apparatus of claim 66 wherein at least one said gripping member includes at least two grippers, each said gripper being capable of at least one among gripping and guiding the elongated item.

68. The apparatus of claim 62 further including a centering device capable of assisting in centering the elongated item in said bore.

69. An apparatus for releasably gripping at least one elongated item and being used in pulling the elongated item through at least one space, the apparatus comprising:
at least first and second body portions, said at least first and second body portions being alignable together longitudinally to form a bore extending at least partially therebetween, wherein the elongated item is at least partially insertable into said bore,
said at least first and second body portions being capable of being pulled through the at least one space; and
a plurality of gripping members projecting inwardly into said bore from at least one among said at least first and second body portions, each said gripping member being capable of at least one among gripping and guiding the elongated item disposed at least partially within said bore.

70. The apparatus of claim 69 further including a releasable holder engageable with said at least first and second body portions.

71. A method of releasably gripping an elongated item with at least one gripping device, the gripping device and elongated item capable of being pulled through at least one path, the method comprising:
aligning at least first and second body portions together longitudinally to form a body;
engaging at least one holder with the at least first and second body portions;
engaging the elongated item with the gripping device;
pulling the gripping device and engaged elongated item through the at least one path;
disengaging the at least one holder from the at least first and second body portions; and
disengaging the at least first and second body portions from the elongated item.

72. The method of claim 71 further including inserting an end of the elongated item into a bore disposed in the body.

73. The method of claim 72 further including the at least first and second body portions forming the bore.

74. The method of claim 72 further including allowing a plurality of gripping members protruding into the bore to engage the elongated item.

75. The method of claim 74 further including disengaging the at least first and second body portions from the elongated item without having to push the elongated item through the bore.

76. The method of claim 74 further including threadably engaging and disengaging the at least one holder with the at least first and second body portion.

* * * * *

UNITED STATES PATENT AND TRADEMARK OFFICE
CERTIFICATE OF CORRECTION

PATENT NO. : 7,478,794 B1
APPLICATION NO. : 11/527130
DATED : January 20, 2009
INVENTOR(S) : Gohlke et al.

It is certified that error appears in the above-identified patent and that said Letters Patent is hereby corrected as shown below:

In Claim 29 at Column 16, line 16, replace "bore2" with "bore".

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,478,794 B1 |
| APPLICATION NO. | : 11/527130 |
| DATED | : January 20, 2009 |
| INVENTOR(S) | : Gohlke et al. |

Page 1 of 1

It is certified that error appears in the above-identified patent and that said Letters Patent is hereby corrected as shown below:

Column 14, line 26, replace "gripper members" with "gripping members".

Column 19, line 2, replace "gripper members" with "gripping members".

Signed and Sealed this

Thirteenth Day of July, 2010

David J. Kappos
*Director of the United States Patent and Trademark Office*